United States Patent [19]
Adam

[11] Patent Number: 5,402,637
[45] Date of Patent: Apr. 4, 1995

[54] IGNITER PLUG EXTENDER FOR A TURBINE ENGINE COMBUSTOR

[75] Inventor: Leroy B. Adam, Redding, Calif.

[73] Assignee: Cooper Industries, Houston, Tex.

[21] Appl. No.: 90,265

[22] Filed: Jul. 13, 1993

[51] Int. Cl.⁶ ............................................. F02C 7/264
[52] U.S. Cl. ................................................. 60/39.827
[58] Field of Search ............. 60/39.827, 39.821, 39.31, 60/909

[56] References Cited

U.S. PATENT DOCUMENTS

| | | | |
|---|---|---|---|
| 2,671,186 | 3/1954 | Shoobert | 60/39.827 |
| 3,319,130 | 5/1967 | Betteridge | 60/39.821 |
| 3,330,985 | 7/1967 | Johnston | 60/39.827 |
| 3,676,674 | 7/1972 | Saviantseff | 250/363.01 |
| 3,750,392 | 8/1973 | Zoll . | |
| 3,800,530 | 4/1974 | Nash . | |
| 4,107,008 | 8/1978 | Horvath | 204/129 |
| 4,194,358 | 3/1980 | Stenger . | |
| 4,215,979 | 8/1980 | Morishita . | |
| 4,275,559 | 6/1981 | Blair . | |
| 4,599,568 | 7/1986 | Couch | 60/909 |
| 4,798,048 | 1/1989 | Clements . | |
| 4,903,476 | 2/1990 | Steber et al. . | |

FOREIGN PATENT DOCUMENTS

| | | | |
|---|---|---|---|
| 2103421 | 8/1972 | Germany | 60/39.821 |
| 1442184 | 7/1976 | United Kingdom | 60/39.827 |

*Primary Examiner*—Timothy S. Thorpe
*Attorney, Agent, or Firm*—Burns, Doane, Swecker & Mathis

[57] ABSTRACT

A plug extender for an igniter for a gas turbine engine combustor includes a coupling head for connecting the plug extender to an engine boss mounted in a wall of a turbine combustor and a terminal shell that connects to a cable of an electrical power source. The plug extender clinches and retains the igniter in the head portion in contact with electrical contact means, which facilitates the installation and removal of the igniter without disassembly of the turbine engine covers. The plug extender also acts as a plug adaptor, allowing different electrical connectors to be used at the igniter contact head portion and the cable connect terminal shell suitable for the particular environment.

14 Claims, 3 Drawing Sheets

5,402,637

IGNITER PLUG EXTENDER FOR A TURBINE ENGINE COMBUSTOR

FIELD OF THE INVENTION

The present invention relates to ignition devices for turbine engine combustors, and more particularly, to a plug extender assembly for connecting an ignition device to an electrical power source that facilitates installation, access and removal of the ignition device in a gas turbine engine.

BACKGROUND OF THE INVENTION

In gas turbine engines, the igniter for the combustion chamber is generally installed by placing it in a mounting boss in a cover or wall of the combustion chamber and attaching a connecter of a power source cable to the mounting boss over the igniter. The cable connector locks the igniter in place and makes an electrical connection between the igniter and the power source. The mounting boss is mounted in a hole in the cover or wall and generally supports the igniter with an ignition tip of the igniter extending into the combustion chamber and a connecting terminal of the igniter extending from the wall or cover to connect to the power cable.

In certain turbine engines, access to the igniter becomes difficult after the engine is assembled. The combustor may be located in a deep part of the engine and other engine components may restrict access to the igniter. This is particularly true of aircraft engines, where physical design limitations demand a tightly packed configuration of the engine components. The installation and removal of igniters in such configurations is difficult, and in certain cases impossible, without a partial disassembly of the engine.

Igniters in turbine engines are subject to extremes of temperature and gaseous environment and require periodic inspection, and frequently require removal and replacement. For igniters in the engine designs which require at least partial disassembling of the engine for access, the amount of time the engine is out of service and the cost of inspection and maintenance are needlessly increased. It is therefore desirable to provide an extender for an ignition plug that facilitates installation of the igniter in a deep or otherwise difficultly accessed engine combustor and allows access to an igniter in an assembled engine for inspection and maintenance.

U.S. Pat. Nos. 3,800,530 to Nash and 4,798,048 to Clements disclose igniter assemblies for augmenter gas turbine engines. These patents disclose devices for extending an igniter into a gas turbine engine augmenter, but not for extending the igniter plug from the engine cover to facilitate installation and removal.

U.S. Pat. No. 4,903,476 to Steber et al. discloses a ball-joint supporter for a gas turbine igniter that permits transverse movement of the igniter electrode tip in response to differential thermal expansion of the combustor casing during operation.

U.S. Pat. No. 4,194,358 to Stenger discloses a double annular combustor having a radially inner pilot stage and radially outer main stage. An elongated igniter tube mounted in the combustor shell extends to the pilot stage but operates conventionally otherwise.

The art does not provide an extender for a gas turbine engine igniter that facilitates the installation and removal of an igniter in an assembled engine.

SUMMARY OF THE INVENTION

The invention, generally, provides an ignition plug extender assembly that facilitates installation and removal of an ignition plug in a combustor of a gas turbine engine.

More particularly, the present invention provides an ignition plug extender assembly that clinches and retains an igniter for a turbine engine to facilitate the installation of the igniter in an engine combustor and the extraction of the igniter from the combustor by handling of the extender assembly. The ignition plug extender of the present invention may be installed in or removed from a combustor cover or wall without the necessity of disassembling of the engine.

The plug extender electrically connects the igniter to a cable of a power source. The extreme range of conditions to which an igniter is subject, particularly in jet aircraft engines, which can range from the extreme high temperature in the combustion chamber to low external temperatures in high altitude flight, make it desirable to use one type of termination for the igniter and a second type of termination for the power cable. The present invention provides an igniter plug extender assembly that allows a terminal connector to be selected for an igniter coupling and a different terminal connector to be selected for a cable connection.

In a preferred embodiment of the invention, the plug extender includes a coupling head with retaining means for carrying an igniter in the coupling head while the plug extender is being installed or removed, and means for electrically connecting the plug extender to a terminal on the igniter. The coupling head includes an interior seal to prevent gases from the combustor from leaking out through the plug extender. The coupling head also includes interior threads for attaching the plug extender to an engine boss in a wall of the combustor.

A tubular adaptor body is attached to a tail portion of the coupling head. The adaptor body may be selected of an appropriate length for the particular situation. A terminal shell is attached to the adaptor body opposite the coupling head and includes means for electrically connecting to a power cable terminal. The coupling head, adaptor body and terminal shell form a continuous interior cavity. The terminal shell includes a hexagonal head to allow installation and removal of the plug extender with conventional tools.

In a preferred embodiment, the igniter retainer means includes a spring having opposed arches that project through two slots in the coupling head to clinch a groove in the igniter, retaining the igniter in the head portion in contact with an electrical contact and an ignition side of the igniter extending from the head portion.

In a preferred embodiment, the electrical contact in the head portion includes an electrically conductive contact member carried in a first insulator sleeve. A conductive pin member is carried in a second insulator sleeve in the terminal shell. The second insulator sleeve includes an inner collar for supporting the pin connector. The conductive contact member and the conductive pin member are electrically connected by an insulated wire carried in the adaptor body which allows the plug extender to connect an igniter to a power source cable.

DESCRIPTION OF THE DRAWINGS

The present invention can be further understood with reference to the following description in conjunction with the appended drawings, wherein like elements are provided with the same reference numerals. In the drawings.

DETAILED DESCRIPTION OF THE PREFERRED EMBODIMENTS

Figure 1:
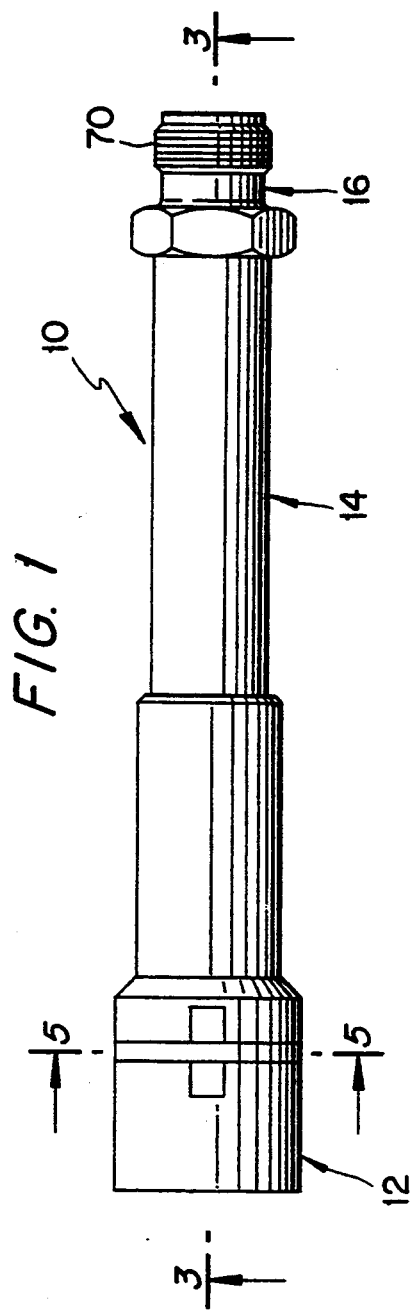
FIG. 1 is a side view of a preferred embodiment of the plug extender of the present invention.

FIG. 1 is a side view of a preferred embodiment of a plug extender 10 of the present invention. The plug extender 10 has a coupling head 12 for attaching the plug extender to a suitable mounting in a wall of an engine combustor, an adaptor body 14 for extending the length of the plug extender, and a terminal shell 16 for attaching the plug extender to a power source.

Figure 2:
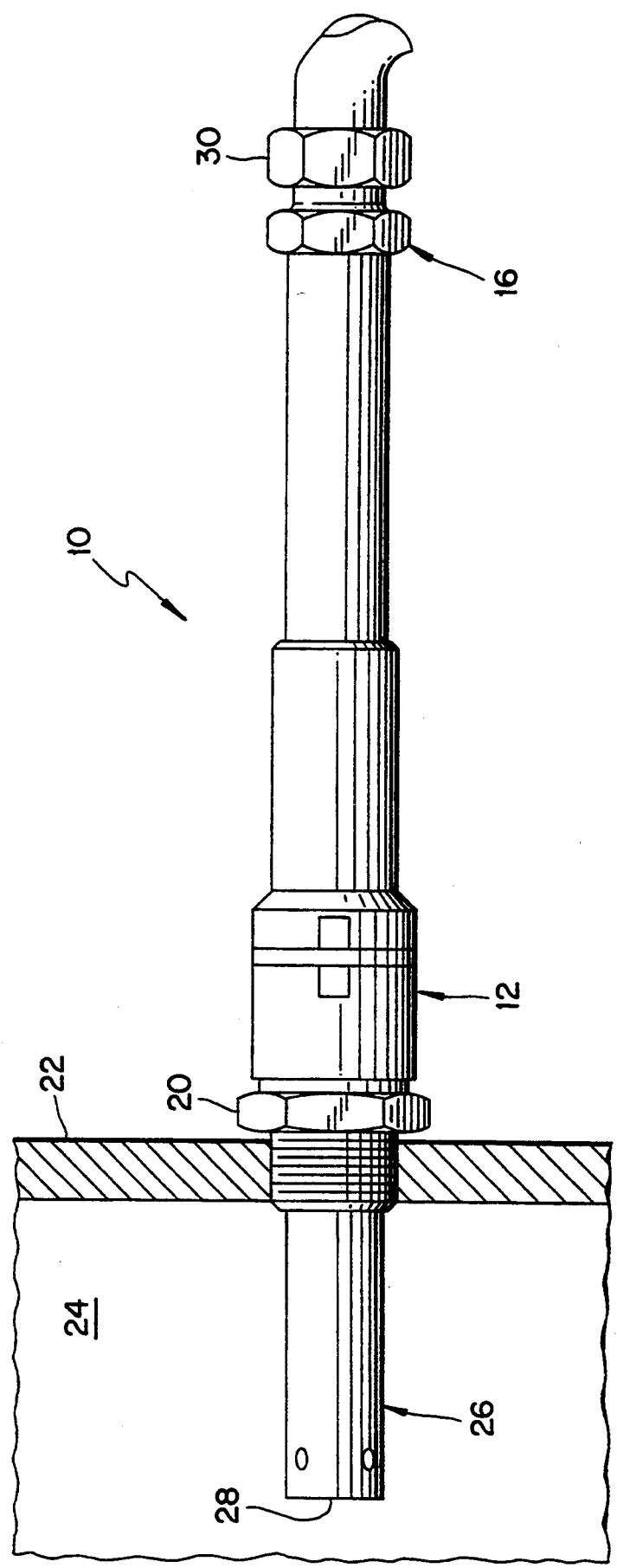
FIG. 2 is a side view of the plug extender of FIG. 1 with an igniter installed in a wall of a combustor and having a power source cable attached.

FIG. 2 shows the plug extender 10 mounted to an engine boss 20. The engine boss 20 is shown installed in a wall 22 of a combustor 24; however, the illustration of FIG. 2 is simplified to show details of the device of the present invention. Those skilled in the art will appreciate that other engine components, walls, and covers have been removed for clarity.

An igniter 26 is carried in the plug extender 10. The ignition end 28 of the igniter 26 protrudes through the engine boss 20 into the combustor 24. A power cable 30 is attached to the plug extender 10 at the terminal shell 16. In a preferred embodiment, the coupling head 12, adaptor body 14 and terminal shell 16 are formed of stainless steel, but other suitable materials may be used.

As illustrated in FIG. 2, the plug extender 10 of the present invention provides an elongated coupling between the igniter 26 and the power cable plug 30. The plug extender 10 of the present invention may be easily adapted to different lengths to fit the particular application by selecting an adaptor body 14 of appropriate length. Because the plug extender 10 carries the igniter 26, the igniter may be installed and removed in the engine combustor by handling the plug extender.

In a conventional installation, by contrast, a power cable is generally connected directly to the igniter and attached to an engine boss or other similar mounting on the wall or cover 22 of the engine. Access to the igniter and cable connecter would be limited by covers or walls of the turbine engine.

Figure 3:
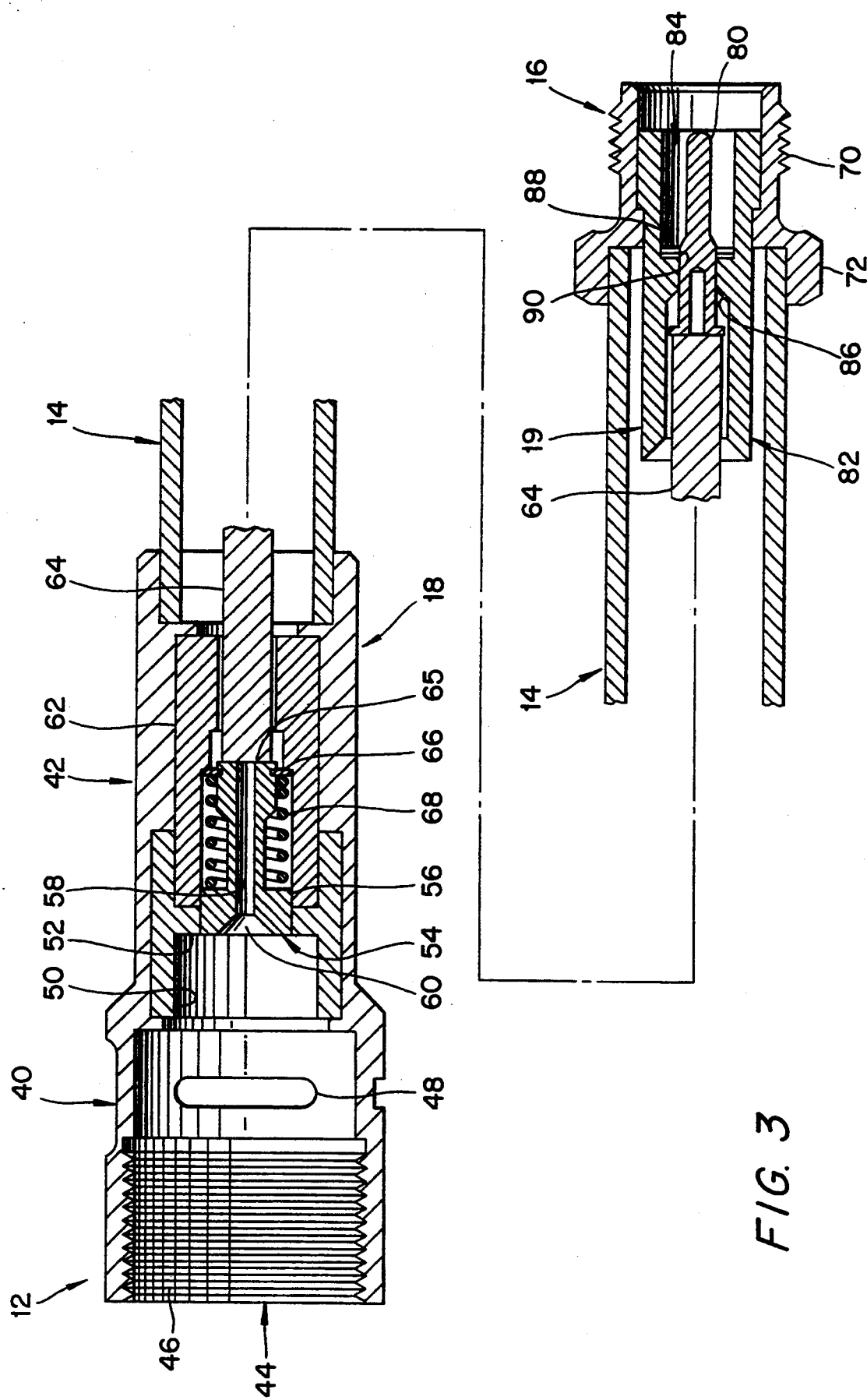
FIG. 3 is a cross-sectional view of the plug extender along the line 3—3 shown in FIG. 1.

FIG. 3 is a cross-sectional view of the plug extender 10. A first electrical contact member 18 for making an electrical connection with a terminal 32 of the igniter is located in the coupling head 12. A second electrical contact member 19 for making an electrical connection with a cable termination 30 of a power source is located in the terminal shell 16. An electrical conductor 64, which is located in the adaptor body 14, connects the first electrical contact member 18 to the second electrical member 19.

Figure 4:
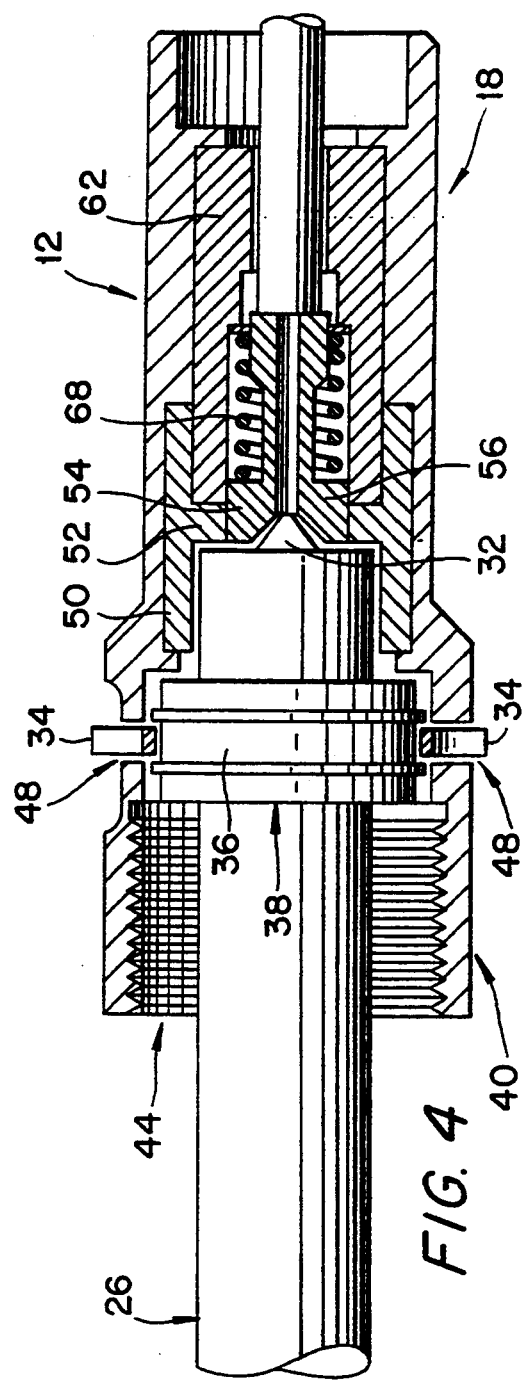
FIG. 4 is a cross-sectional view of the coupling head of the plug extender with an igniter retained in the coupling head by a retainer spring.
Figure 5:
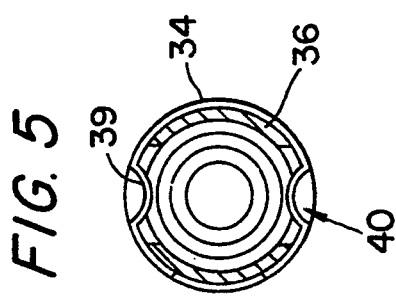
FIG. 5 is a cross-sectional view taken along the line 5—5 of FIG. 1.
Figure 6:
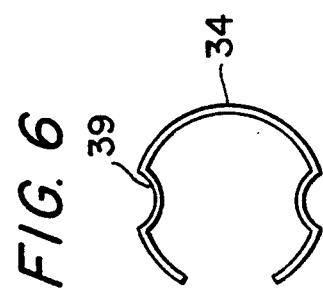
FIG. 6 is a side elevation of the igniter retaining spring.

The coupling head 12 is a generally hollow cylinder shaped member and includes a head portion 40 and a tail portion 42. The head portion 40 is wider than the tail portion 42, and the head portion defines an interior igniter receiving space 44. The coupling head 12 has internal threads 46 in the head portion 40 for mounting to an engine boss 20, as generally illustrated in FIG. 2. Slots 48 are provided in the wall of the head portion 40 for receiving a spring 34 for retaining an igniter 26 in the igniter receiving space 44, as shown in FIGS. 4–6. The spring 34 prevents the igniter 26 from moving axially out of the receiving space 44, but the igniter is free to rotate within the receiving space.

A seal 50 is fitted in the tail portion 42 adjacent to the head portion 40. The seal 50 prevents gases from the combustor from escaping through the plug extender 10. The seal 50 also increases the dielectric strength of the electrical connection between the extender 10 and the igniter 26. The seal 50 is arranged in the tail portion to fit without a gap between an outer side of the seal 50 and an inner side of the tail portion 42. The seal 50 is tubular in shape and has an interior flange 52 located at about the midpoint along its length.

The first electrical contact member 18 includes an electrical contact member 54 which mates with a projection 32 of the igniter 26. The contact member 54 has a disk shaped head 56 that fits within the flange 52 of the seal 50 with the flange 52 acting as a support bearing. A stem portion 58 of the contact member 54 extends from the disk shaped head 56 toward the adaptor body 14. The disk shaped head 56 is wider than the stem portion 58 which gives the contact member 54 a mushroom-like appearance. At a front face of the disk shaped head 56 is a frusto-conical recess 60 that mates with the projection 32 on the igniter 26 to make an electrical connection, as generally illustrated in FIG. 4.

A circumferential groove 36 in the base 38 of the igniter 26 is aligned with the slots 48 in the head portion 40 of the coupling head 12. The retaining spring 34 encircles the head portion 40 and protrudes through the slots 48 to engage the circumferential groove 36 to clinch the base 38 and retain the igniter 26 in the igniter receiving space 44. The retaining spring 34 is a generally "C" shaped member having two opposed, inwardly directed arches 39. The arches 39 protrude through the slots 48 to engage the circumferential groove 36. The retaining spring 34 is installed and removed from the head portion 40 with conventional tools, which allows the igniter 26 to be easily clinched in or removed from the plug extender 10.

An insulator sleeve 62 is fitted in the tail portion 42 between the seal 50 and the adaptor body 14. The insulator sleeve 62 is a generally tubular shaped member preferably formed of a 94% to 96% alumina glazed ceramic. The insulator sleeve 62 also fits in the seal 50 abutting the inner flange 52. The stem portion 58 of the contact member 54 extends through the insulator sleeve 62 where it is connected to an electrical conductor 64. The insulator sleeve 62 electrically isolates the contact member 54 and electrical conductor 64 from the tail portion 42.

A retaining ring 66 is fitted in a groove 65 on the stem portion 58 to retain the contact member 54 in an appropriate position for maintaining electrical contact with the igniter 26. A coil spring 68 arranged around the stem portion 58 provides a force urging the disk shaped head 56 toward the left as viewed in FIG. 3 to maintain contact member 54 in engagement with the projection 32.

The electrical conductor 64 is preferably a nickel plated copper conductor encased in a silicon braid jacket insulation. The electrical conductor 64 is connected to the base of the contact member 54 by any suitable means, such as crimping. The conductor 64 is carried in the adaptor body 14 to the terminal shell 16 where it connects with the second electrical contact member 19. As mentioned above, the plug extender 10 may be adapted for different turbine engine installations by selecting an adaptor body 14 of appropriate length. The conductor 64 is accordingly selected of appropriate length for the particular application.

The terminal shell 16 is attached to the adaptor body 14 at the end opposite the coupler head 12. The terminal shell 16 provides means for connecting the plug extender 10 to a power cable 30 (FIG. 2). Threads 70 are formed on the exterior of the terminal shell 16 to permit a screw connection with a power cable fastener. A hexagonal head 72 is formed on the terminal shell 16 to allow the terminal shell to be grasped with a standard tool, such as a wrench, which facilitates the installation and removal of the plug extender 10. The threads 70 and hexagonal head 72 are illustrated in FIG. 1.

The second electrical contact member 19 is housed in the terminal shell 16. In a presently preferred embodiment of the invention, the second electrical contact member 19 and terminal shell 16 conform to a SAE ARP670 Type 2F electrical termination. The second electrical contact member 19 includes a pin contact 80, which is preferably formed of leaded copper and has a silver underplating and gold plating. The pin contact 80 is connected to the electrical conductor 64 by suitable means, such as crimping. A second insulator sleeve 82 fits within the terminal shell 16 for electrically isolating the pin contact 80 from the terminal shell. The second insulator sleeve 82, which is preferably formed of polytetrafluoroethylene, is generally tubular shaped with a hollow interior 84 for housing the pin contact 80. An inner collar 86 acts as a bearing surface for the pin contact 80. A retaining ring 88 is mounted in a groove 90 on the pin contact 80 for maintaining the position of the pin contact in the insulator sleeve 82.

The plug extender 10 of the present invention, which, by retaining the igniter, acts as an installation tool, facilitates the installation and removal of an igniter 26 in a turbine engine. The plug extender 10 may be grasped at the terminal shell 16 by a suitable tool and screwed into the engine boss 20. The igniter 26, carried in the coupling head, is thus installed into the engine wall 22. By unscrewing and removing the plug extender 10 from the engine boss 20, the igniter 26 is accordingly easily removed from the combustor. In order to assemble the extender 10 with the igniter 26, the igniter is inserted into the end of the igniter receiving space 44 in the coupling head 12 so that the projection 32 contacts the electrical contact 54 and the retaining spring 34 is placed around the coupling head and into the slots 48.

The foregoing has described the preferred principles, embodiments and modes of operation of the present invention; however, the invention should not be construed as limited to the particular embodiments discussed. Instead, the above-described embodiments should be regarded as illustrative rather than restrictive, and it should be appreciated that variations, changes and equivalents may be made by others without departing from the scope of the present invention as defined by the following claims.

What is claimed is:

1. A plug extender for an igniter for a gas turbine engine combustor, comprising:
   a coupling head, said coupling head having a hollow, generally cylindrical wall and having head portion and a tail portion, said head portion defining an interior igniter receiving space and having means for mounting the coupling head in a wall of a gas turbine engine combustor, said head portion having circumferential slots in the wall;
   an adapter body extending from said tail portion, said adapter body having an elongated hollow tubular shape;
   a terminal shell attached to said adapter body opposite said coupling head, said terminal shell having a first and second end, said second end being attached to said adapter body, and said terminal shell, adapter body and coupling head forming a continuous hollow interior cavity, said first end having means for attaching a connector of an ignition power cable;
   means for retaining an igniter in said igniter receiving space in the coupling head comprising a retaining spring which extends radially inward through the slots and engages a circumferential groove in the igniter to releasably retain the igniter in a position so that an electrical terminal of the igniter is in proximity with said first electrical contact means, and an ignition end of the igniter extends from the head portion;
   first electrical contact means for establishing an electrical connection with an electrical terminal of the igniter, said first electrical contact means being located in said tail portion adjacent to said igniter receiving space;
   second electrical contact means for establishing an electrical connection with an ignition cable of an electrical power source, said second electrical contact means being located in said terminal shell intermediate of said first and second ends; and,
   electrical conductor means for electrically connecting said first electrical contact means and said second electrical contact means.

2. The plug extender as claimed in claim 1, wherein the retaining spring comprises a C-shaped spring member which encircles the head portion, said retaining spring having opposed arches for protruding through the circumferential slots to clinch a groove in the igniter.

3. The plug extended as claimed in claim 1, further comprising a seal located in said coupling head for preventing gases from the combustor from escaping through the plug extender.

4. The plug extender as claimed in claim 1, wherein the seal is fitted in said tail portion adjacent to said head portion, said seal having a hollow cylindrical shape and having an interior flange.

5. The plug extender as claimed in claim 1, wherein the first electrical contact means comprises an insulator sleeve located in the tail portion, said insulator sleeve abutting a flange of the seal, and a contact member located within the insulator sleeve and fitted in the seal flange, the contact member being electrically connected to said electrical conductor means.

6. The plug extender as claimed in claim 5, wherein wherein the insulator is formed of a glazed alumina ceramic.

7. The plug extender as claimed in claim 1, wherein the contact member is formed of silver plated brass.

8. The plug extender as claimed in claim 1, wherein the second electrical contact means comprises a second insulator sleeve fitted within the terminal shell, said second insulator sleeve having an inner collar, and a pin contact located in said second insulator sleeve and supported by the inner collar, said pin contact being electrically connected to the electrical conductor means.

9. The plug extender as claimed in claim 8, wherein the insulator is formed of polytetrafluoroethylene.

10. The plug extender as claimed in claim 8, wherein the pin contact is leaded copper having a silver underplating and a gold plating.

11. The plug extender as claimed in claim 1, wherein the electrical conductor means comprises a nickel plated copper wire having glass braid reinforced silicon insulation and a silicon outer jacket.

12. The plug extender as claimed in claim 1, wherein the means for mounting the coupling head in a wall of a gas turbine engine combustor comprises internal threads in the head portion of the coupling head for screwing the plug extender onto an engine boss in the combustor wall.

13. The plug extender as claimed in claim 1, wherein the second end of the terminal shell is formed as a hexagonal head, and the means for attaching a connector of an ignition power cable to the terminal shell comprises external threads on the first end of the terminal shell for screwing to a connector of an ignition power cable.

14. A plug extender for an igniter of a gas turbine engine, comprising:
- an elongated adapter body having a terminal shell adjacent one end and a coupling head for mounting the plug extender to a combustor of an engine adjacent the opposite end, said coupling head having a cylindrical wall defining a recess and said wall having at least one slot therethrough;
- first electrical contact means in said recess of said coupling head;
- second electrical contact means in said terminal shell for connecting the plug extender to a source of power;
- an igniter having a distal end and a cylindrically shaped base at a proximal end, said base having an electrical terminal extending proximally therefrom and having a circumferential groove that aligns with the slot in the coupling head when the base is received in said recess;
- a retaining spring which extends radially inward through the slot in the coupling head to engage the circumferential groove in an igniter to releasably retain the base of the igniter in said recess in a position so that the electrical terminal is in proximity with said first electrical contact means;
- conductor means in said adapter body interconnecting said first and second electrical contact means; and
- means for insulating said conductor means from said adapter body.

* * * * *